US 6,561,733 B1

(12) United States Patent
Sayers et al.

(10) Patent No.: US 6,561,733 B1
(45) Date of Patent: May 13, 2003

(54) METHOD AND APPARATUS FOR TREATING LANDFILLS

(75) Inventors: Stephen D. Sayers, Knoxville, TN (US); Carleton P. Edmunds, Knoxville, TN (US)

(73) Assignee: Polymaster, Inc., Knoxville, TN (US)

( * ) Notice: Subject to any disclaimer, the term of this patent is extended or adjusted under 35 U.S.C. 154(b) by 0 days.

(21) Appl. No.: 09/885,488

(22) Filed: Jun. 20, 2001

(51) Int. Cl.[7] .............................. B09B 1/00; E02D 31/00
(52) U.S. Cl. .......................... 405/129.45; 405/129.25; 405/129.55; 405/128.15
(58) Field of Search ...................... 405/129.25, 129.45, 405/129.55, 128.15, 129

(56) References Cited

U.S. PATENT DOCUMENTS

| | | | | |
|---|---|---|---|---|
| 2,889,883 A | * | 6/1959 | Santora ................. 106/287.24 |
| 3,199,590 A | * | 8/1965 | Young ......................... 166/33 |
| 3,393,738 A |   | 7/1968 | Bernard et al. |
| 3,656,550 A | * | 4/1972 | Wagner et al. ............... 166/269 |
| 3,708,013 A | * | 1/1973 | Dismukes .................... 166/276 |
| 3,831,859 A |   | 8/1974 | Allard |
| 3,861,465 A | * | 1/1975 | Mignotte ...................... 166/127 |
| 3,894,131 A |   | 7/1975 | Speech |
| 4,069,869 A | * | 1/1978 | Sandiford .................... 166/270 |
| 4,167,491 A | * | 9/1979 | Gablin et al. .................. 588/6 |
| 4,291,069 A | * | 9/1981 | Pilny ........................... 138/97 |
| 4,300,861 A |   | 11/1981 | Vartiak |
| 4,325,652 A | * | 4/1982 | Kirschke ................ 405/129.55 |
| 4,388,878 A |   | 6/1983 | Demzin |
| 4,431,057 A | * | 2/1984 | Colonna et al. ............. 166/222 |
| 4,453,857 A | * | 6/1984 | Serra et al. .................. 376/272 |
| 4,519,338 A |   | 5/1985 | Kramer et al. |
| 4,795,590 A |   | 1/1989 | Kent et al. |
| 4,807,544 A |   | 2/1989 | Cross et al. |
| 4,856,588 A |   | 8/1989 | Borchardt |
| 4,903,618 A |   | 2/1990 | Blair |
| 4,904,753 A | * | 2/1990 | Watts et al. ................. 525/480 |
| 5,011,330 A |   | 4/1991 | Kittle et al. |
| 5,062,740 A | * | 11/1991 | Payne ......................... 156/547 |
| 5,277,830 A | * | 1/1994 | Hoskin et al. ............... 507/213 |
| 5,372,462 A |   | 12/1994 | Sydansk |
| 5,416,249 A | * | 5/1995 | Crayne et al. ........... 220/23.91 |
| 5,416,251 A | * | 5/1995 | Lomasney et al. .......... 141/263 |
| 5,459,181 A | * | 10/1995 | West et al. ................. 523/132 |
| 5,567,088 A | * | 10/1996 | Shotts et al. ................ 166/295 |
| 5,881,493 A |   | 3/1999 | Restive |
| 5,980,446 A | * | 11/1999 | Loomis et al. ......... 405/129.45 |

OTHER PUBLICATIONS

NIOSH Publication 77–112, :"Criteria for a recommended standard . . . occupational exposure to Acrylamide" Oct. 1976, cover and pp. 17–18.*

IAIR International Journal of Environmental Studies, vol. 3, 2000, "The Chemical Characteristics and Leachability of Spent Foundry Sands", from www.systems.org/HTML/Environmental_Studies/es–v03/ji_body.htm.*

* cited by examiner

*Primary Examiner*—Robert J. Sandy
*Assistant Examiner*—Katherine Mitchell
(74) *Attorney, Agent, or Firm*—Luedeka, Neely & Graham, P.C.

(57) ABSTRACT

A method for treating a landfill formation. The method includes the steps of preparing a water soluble resin solution, preparing a catalyst solution, and introducing separate streams of the resin and the catalyst into the landfill formation in a manner that avoids mixing air into the resin and catalyst streams and promotes mixing of the resin and catalyst streams to yield a substantially fluid impervious treatment substrate within desired locations in the landfill formations to inhibit effusion of gas and travel of liquids therein.

7 Claims, 4 Drawing Sheets

METHOD AND APPARATUS FOR TREATING LANDFILLS

FIELD OF THE INVENTION

This invention relates generally to the treatment of landfills to inhibit undesirable travel of gases and liquids. More particularly, this invention relates to a method and apparatus for application of a treatment composition to inhibit undesirable fluid flow to reduce groundwater contamination and methane gas leaks.

BACKGROUND AND SUMMARY OF THE INVENTION

Various governmental regulations relate to the construction and operation of landfills. Many of these regulations relate to measures intended to reduce contamination of groundwater and the emission of undesirable gases generated by the landfill, such as methane gas. For example, groundwater monitoring involves testing groundwater wells to determine whether waste materials have escaped from the landfill.

The present invention is directed to methods and apparatus for reducing the escape of liquids and gases from landfills.

In a preferred embodiment, the method includes the steps of preparing a water soluble resin solution, preparing a catalyst solution, and introducing separate streams of the resin and the catalyst into the landfill formation in a manner that avoids mixing air into the resin and catalyst streams and promotes mixing of the resin and catalyst streams to yield a substantially fluid impervious treatment substrate within desired locations in the landfill formations to inhibit effusion of gas and travel of liquids therein.

The apparatus preferably includes a source of a pressurized stream of resin solution, a source of a pressurized stream of a catalyst solution, and a probe. The probe separately conveys the stream of the resin solution and the stream of the catalyst solution within the probe toward a desired location in the landfill formation corresponding to the location of one or more of the cavities and thereafter ejects the streams of resin and catalyst into the desired location in the landfill in a manner that promotes travel of the resin and catalyst into one or more of the cavities and promotes mixing of the catalyst and the resin streams. This mixing promotes reaction of the resin and catalyst to yield a substantially fluid impervious treatment substrate within one or more of the cavities in the landfill formation to inhibit effusion of gas and travel of liquids therein.

The probe has separate resin and catalyst inlets in flow communication with respective and separate resin and catalyst flow paths within the probe, and separate resin and catalyst outlets in flow communication with the resin and catalyst flow paths, respectively, and the formation for ejecting the resin and catalyst from the probe. Resin outlets are located adjacent catalyst outlets and positioned such that the ejected resin and catalyst contact one another and form a stream of resin and catalyst that promotes mixing of ejected resin with ejected catalyst within the formation.

BRIEF DESCRIPTION OF THE DRAWINGS

Further advantages of the invention will become apparent by reference to the detailed description of preferred embodiments when considered in conjunction with the figures, which are not to scale, wherein like reference numbers indicate like elements through the several views, and wherein.

DETAILED DESCRIPTION

Figure 1:
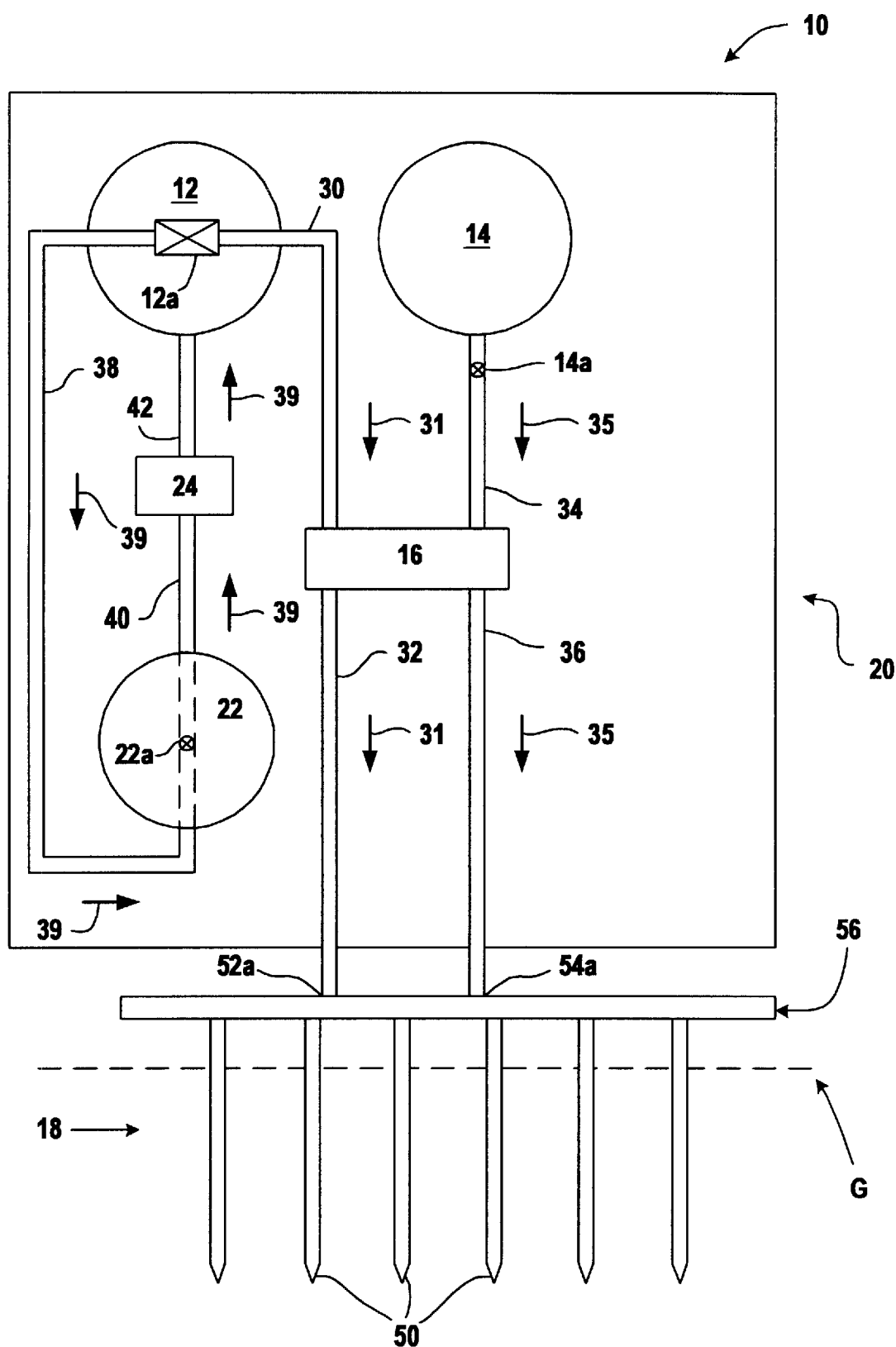
FIG. 1 is a plan view showing apparatus for use in treating landfill sites in accordance with the invention.

The invention provides methods and apparatus for treating landfill sites by sub-surface injection of a treatment composition that forms a substantially fluid (liquid and gas) impervious substrate within fissures and other subsurface voids. In the context of a landfill, the substrate serves to inhibit the effusion of gas (e.g. methane gas) and/or inhibit the travel of liquids (water).

In a preferred embodiment, the method involves substantially simultaneously injecting a water soluble resin component and a catalyst component, both preferably pre-prepared in fluid form, under and into the soil so as to mix the resin and catalyst as they are injected. The injection process purposely avoids mixing air (other than incidental ambient air) into the treatment materials.

Once mixed, the resin and catalyst undergo a polymerization reaction and solidify in-situ into a gelatine-like state, preferably within from about 3 to about 5 minutes. The injection is preferably done at various locations until a desired treatment area has been desirably affected. The resin is preferably an aminoplast resin and the catalyst is preferably an acid-based catalyst.

The treatment is generally not a permanent fix and must be repeated periodically to maintain the landfill within acceptable parameters, such as parameters corresponding to governmentally set standards. That is, the landfill fluids are generally somewhat migratory and the soil matrix frangible, such that the fluids may, over time, create or find alternate paths. Nonetheless, it has been observed that the invention offers substantial benefits in both cost and performance over conventional leachate/gas control methods.

The resin and catalyst are preferably pre-prepared in fluid form. Each can be stored in the fluid form for up to about 60 days. The resin powder is available in 55 pound bags and the catalyst concentrate in one gallon containers.

The resin powder is preferably mixed with water, at a resin to water ratio of from about 2 lb/gal to about 4 lb/gal, most preferably from about 2.8 to about 3.0 lb/gal (e.g., approximately 110 pounds resin with 37 gallons water). A preferred resin component is an aminoplast resin available in dry powder form under the trademark POLYMASTER R-501 from Polymaster, Inc. of Knoxville, Tenn.

The catalyst concentrate is preferably mixed with water, at a concentrate to water ratio of from about 0.1 to about 0.05, most preferably about 0.07 (e.g., approximately 3 gallons of concentrate with 42 gallons of water). A preferred catalyst component a non-foaming acid based catalyst available as a liquid concentrate under the trademark LF-541 from Polymaster, Inc. of Knoxville, Tenn. The primary component of the LF-541 concentrate is phosphoric acid. Other preferred acids include sulfuric acid and hydrochloric acid.

The prepared resin and catalyst solutions are maintained in separate containers for feeding, on a preferably substantially equal volume basis, to the application apparatus. The application apparatus maintains the components separate therein until injecting them in a desired soil location in a manner that promotes mixing of the components. In a preferred embodiment, an application device includes a plurality of spaced apart probes for simultaneously injecting treatment into a plurality of soil locations.

Accordingly, and with reference to FIG. 1, there is shown an injection system 10 in accordance with a preferred embodiment of the invention. The system 10 includes a resin tank 12 and associated exit valve 12a, catalyst tank 14 and associated exit valve 14a, and a device, such as pump 16, for pressurized delivery of the resin and catalyst to a probe assembly 18. The tanks 12 and 14, and the pump 16 are each preferably located on a transportable platform 20.

Figure 1A:
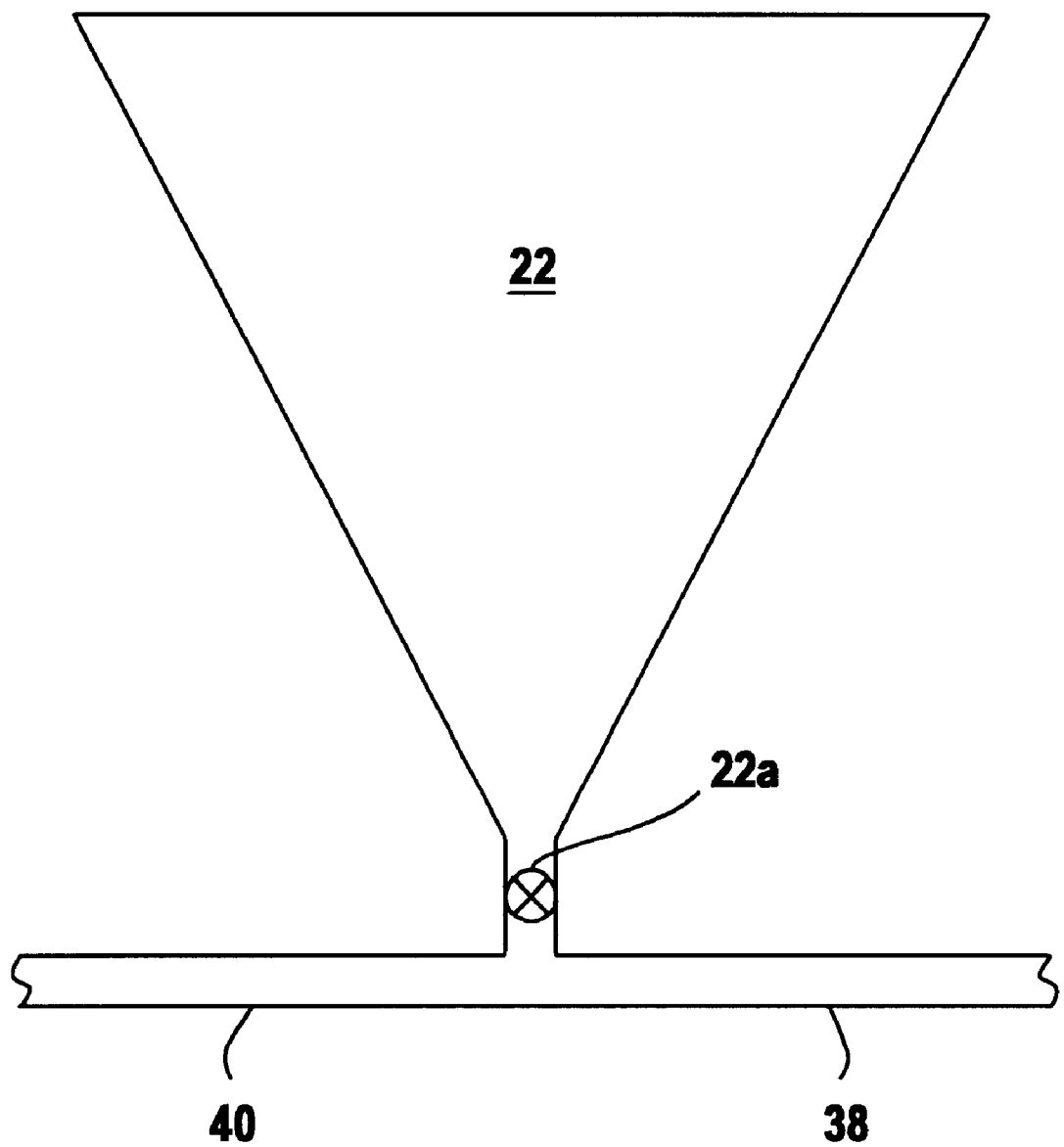
FIG. 1a is an enlarged portion of a hopper assembly for use with the system of FIG. 1.

The catalyst may be introduced into the tank 14 in a diluted form corresponding to the desired dilution. Likewise, the resin may be previously combined with water in the desired amount and introduced into the tank 12. However, in order to facilitate handling of the dry resin and maintenance of a substantially fluid resin/water mixture, e.g. avoiding settling, clumping and the like, it is preferred that the resin tank 12 be configured to enable mixing of the resin and water therein and to enable recirculating to maintain advantageous resin mixture properties. Accordingly, in a preferred embodiment, the system 10 further preferably includes a hopper 22 and valve 22a, and a mixing pump 24 for introducing and mixing the resin with water previously added to the tank 12 (FIG. 1a) As will be appreciated, the pumps 16 and 24 may, for example, be electric pumps powered as by a gas generator located on the platform 20 or as by use of extension cords from another power source.

Conduits 30 and 32 are provided for flow of the resin from the tank 12 to the probe assembly 18 in the direction of the arrows 31. Conduits 34 and 36 are provided for flow of the catalyst from the tank 14 to the probe assembly 18 in the direction of the arrows 35. Valves 12a and 14a control the volume of resin and catalyst flow from the tanks 12 and 14, respectively. Conduits 38, 40, and 42 are provided for recirculating the resin mixture and for mixing dry resin added via the hopper 22. Flow in the conduits 38–42 is in the direction of the arrows 39. Valve 22a controls the introduction of dry resin from the hopper 22. Valve 12a, in addition to controlling flow of resin in conduit 30, also controls the volume of resin flow in the conduits 38–42.

The probe assembly 18 receives resin and catalyst from the conduits 32 and 36 and flows the respective streams of resin and catalyst into the ground G. The probe assembly 18 includes at least one probe 50, but in a preferred embodiment includes a plurality of probes 50 for substantially simultaneously introducing resin and catalyst at a plurality of locations within the ground G. Each probe 50 has a resin inlet 52 and a catalyst inlet 54 (FIG. 2).

In this regard, the assembly 18 preferably includes a distributor 56 in flow communication with the conduits 32 and 36 for distributing substantially uniform flows of resin to the resin inlet 52 of each probe 50 and substantially uniform flows of catalyst to the catalyst inlet 54 of each probe 50. The distributor may, for example, have a resin inlet 52a and a catalyst inlet 54b connected to the conduits 32 and 36, respectively. The introduced resin and catalyst are then separately routed, as by internal conduits or distribution channels to the inlets 52 and 54, respectively, of each of the probes.

Figure 2:
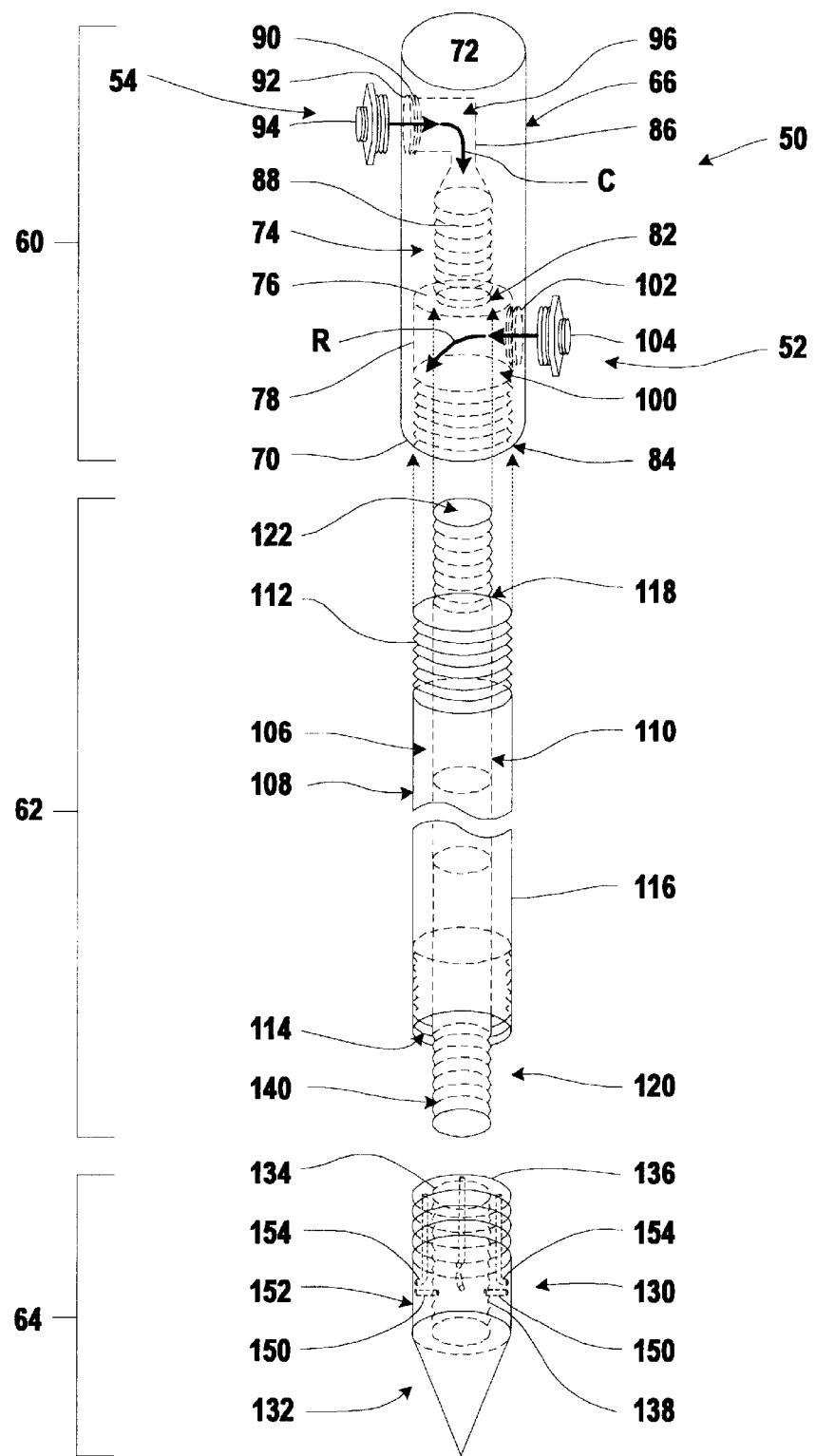
FIG. 2 is an exploded view showing a preferred embodiment of a probe for use in treating landfill sites in accordance with the invention.

With additional reference to FIG. 2, each probe 50 is configured for maintaining the resin and catalyst components separate therein until injecting them in a desired soil location in a manner that promotes mixing of the resin and catalyst. In this regard, the probe 50 includes a head section 60, an extended body portion 62 and a cone section 64, each preferably configured for threadable interconnection with its adjacent part.

The head section 60 is preferably provided by a cylindrical housing 66 having a cylindrical sidewall 68 between an open end 70 opposite a closed end 72 so as to define an internal blind bore 74.

A cylindrical member 76 is positionable within the housing 66 and includes a sidewall 78 extending between opposite open ends 82 and 84 of the member 76 is positioned within the housing 66. A portion of the member 76 adjacent the end 84 of the member 76 is preferably internally threaded so as to enable a portion of the body member 62 to be threaded thereto. The end 82 is configured for receiving an L-shaped member 86.

In this regard, the L-shaped member 86 includes an internally threaded end 88 configured to threadably receive a portion of the body member 62. An opposite internally threaded end 90 of the member 86 may be positioned adjacent an aperture 92 through sidewall 68 of the housing 66 and threadably receive a fitting 94 to define the catalyst inlet 54. The L-shaped member 86 includes an internal channel 96 and the catalyst solution flows from the inlet 54 through the channel 96.

The outer diameter of the cylindrical member 76 is less than the inner diameter of the housing 66 so as to define an annular area 100 for introduction and travel of the resin. In this regard, a threaded aperture 102 is preferably provided through the sidewall 68 of the housing 66 adjacent the annular area 100 for receiving a threaded fitting 104 to define the resin inlet 52. The resin may then flow via the annular area 100 into a corresponding annular area 106 in the body portion 62.

The body portion 62 is preferably provided by a cylindrical member 108 and a smaller cylindrical member 110 disposed within the cylindrical member 108. The member 108 has an externally threaded end 112 opposite an internally threaded end 114. The end 112 is threadably received within end 84 of the member 76 such that once the member 108 is installed, sidewall 116 of the member 108 and sidewall 78 of the member 76 are substantially continuous and result in the annular area 106 within the body portion 62 for flow of resin.

The smaller cylindrical member 110 has opposite externally threaded ends 118 and 120. The end 118 is received within end 88 of the L-shaped member 86 such that interior channel 122 of the member 110 is substantially continuous with the channel 96 of the L-shaped member 86 for flow of catalyst.

The cone member 64 includes a cylindrical portion 130 adjacent a terminal cone-shaped portion 132. The cone-shaped portion is configured to facilitate insertion of the probe into the ground for subsequent release of resin and catalyst into desired locations within the ground, such as in fissures and other voids.

A blind bore 134 is centrally located within the cylindrical portion 130 and extends through planar end surface 136 of the cylindrical portion 130. The bore 134 preferably includes threads 138 for threadably receiving the threaded end 120 of the smaller cylindrical member 110. Exterior threads 140 are located at end 120 of the cylindrical portion 130 of the cone member 64 to enable the cone member 64 to be threadably received by the end 114 of the body portion 62.

As will be appreciated, the channel 122 of the body portion 62 through which catalyst flows is in flow communication with the bore 134 of the cone member 64 when the cone member 64 is installed on the body portion 62. To enable catalyst to exit the cone member 64, a plurality of bores or conduits 150 extend between the bore 134 and exterior sidewall 152 of the cylindrical portion 130.

It will similarly be understood that the annular area 106 within the body portion 62 for flow of resin terminates at the planar surface 136 of the cone member 64 when the cone member is installed on the body portion 62. To enable resin to exit the cone member 64, a plurality of bores or conduits 154 extend between the surface 136 and the exterior sidewall 152 of the cylindrical portion 130.

Figure 2A:
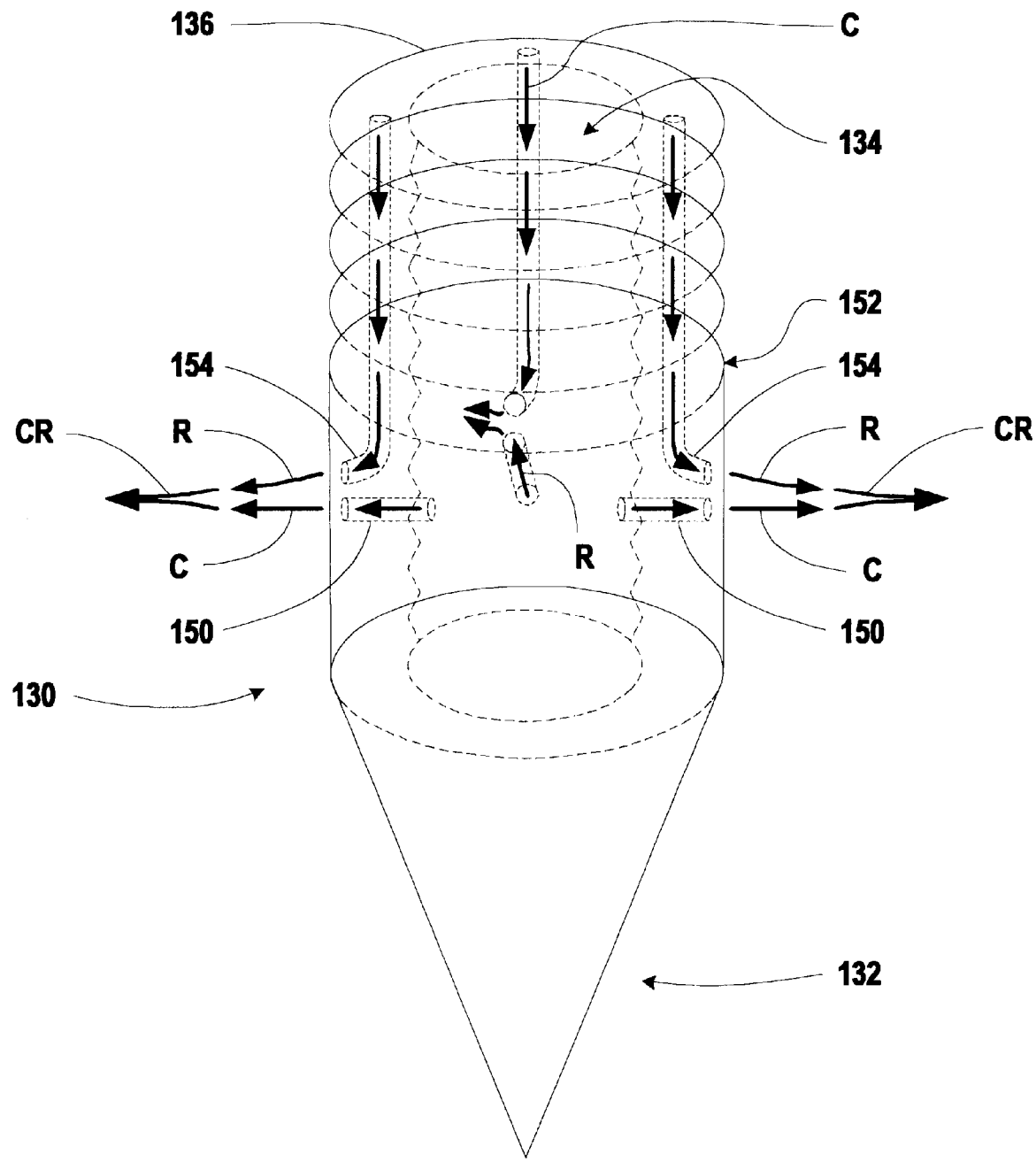
FIG. 2a is an enlarged portion of a cone portion of the probe of FIG. 1.

With additional reference to FIG. 2a, it will be appreciated that the probe 50 is generally configured to maintain separate flow paths for the resin and catalyst through the length of the probe. However, it is desirable that the resin and catalyst be ejected from the probe in a manner that facilitates intermixing of the resin and catalyst to promote a polymerization reaction and solidify in-situ into a gelatine-like state. Accordingly, as best seen in FIG. 2a, the bores 150 and 154 preferably exit the cone member such that a bore 150 is closely adjacent each bore 154 so that the flow of catalyst (indicated by arrow C) from each bore 150 merges with a flow of resin (arrow R) to yield a combined flow CR that promotes mixing of the catalyst and resin as the fluids travel away from the probe and into the ground formation.

In this regard, it has been discovered that injection of the treatment materials into subsurface formations in accordance with the invention results in the formation of a substantially fluid (liquid and gas) impervious substrate within fissures and other subsurface voids that advantageously inhibits the undesirable effusion of gas and/or travel of liquids.

The foregoing description of certain exemplary embodiments of the present invention has been provided for purposes of illustration only, and it is understood that numerous modifications or alterations may be made in and to the illustrated embodiments without departing from the spirit and scope of the invention as defined in the following claims.

What is claimed is:

1. Apparatus for treating a landfill formation having cavities therein, the apparatus comprising a source of a pressurized stream of resin solution, a source of a pressurized stream of a catalyst solution, and a probe for separately conveying the stream of the resin solution and the stream of the catalyst solution within the probe toward a desired location in the landfill formation corresponding to the location of one or more of the cavities and thereafter ejecting the streams of resin and catalyst into the desired location in the landfill in a manner that promotes travel of the resin and catalyst into one or more of the cavities and promotes mixing of the catalyst and the resin streams to promote reaction thereof to yield a substantially fluid impervious treatment substrate within one or more of the cavities in the landfill formation to inhibit effusion of gas and travel of liquids therein, the probe having separate resin and catalyst inlets in flow communication with respective and separate resin and catalyst flow paths within the probe, and separate resin and catalyst outlets in flow communication with the resin and catalyst flow paths, respectively, and the formation for ejecting the resin and catalyst from the probe, wherein resin outlets are located adjacent catalyst outlets and positioned such that the ejected resin and catalyst contact one another and form a stream of resin and catalyst that promotes mixing of ejected resin with ejected catalyst within the formation.

2. The apparatus of claim 1, wherein the source of pressurized resin comprises a tank of a resin solution and a pump for pressurized conveyance of the resin solution to the probe.

3. The apparatus of claim 1, wherein the source of pressurized catalyst comprises a tank of a catalyst solution and a pump for pressurized conveyance of the catalyst solution to the probe.

4. The apparatus of claim 1, wherein the resin is an aminoplast resin.

5. The apparatus of claim 1, wherein the catalyst comprises a sulfonic acid.

6. The apparatus of claim 1, wherein the probe comprises a plurality of probes.

7. The apparatus of claim 1, wherein the probe comprises a head section having separate resin and catalyst inlets in flow communication with separate resin and catalyst flow paths, respectively, located within the head section; an extended body section having separate resin and catalyst flow paths in respective flow communication wit the resin and catalyst flow paths of the head section, and a cone section, having separate resin and catalyst flow paths in respective flow communication wit the resin and catalyst flow paths of the body section, the cone section further including a plurality of resin ejection conduits and a plurality of catalyst ejection conduits in respective flow communication with the resin and catalyst flow paths of the cone section, each resin and catalyst ejection conduit further being in flow communication with the formation and positioned such that resin and catalyst are ejected into the formation in a manner that promotes mixing of resin and catalyst within the formation.

\* \* \* \* \*